United States Patent
Brown et al.

(10) Patent No.: US 7,461,396 B2
(45) Date of Patent: Dec. 2, 2008

(54) SYSTEM AND METHOD FOR PROVIDING A SECURE ENVIRONMENT FOR PERFORMING CONDITIONAL ACCESS FUNCTIONS FOR A SET TOP BOX

(75) Inventors: Chris Brown, Raleigh, NC (US); Nicol So, Bensalem, PA (US); Gregory Kazmierczak, Belle Meade, NJ (US)

(73) Assignee: Paladin Patents Inc., Wilmington, DE (US)

( * ) Notice: Subject to any disclaimer, the term of this patent is extended or adjusted under 35 U.S.C. 154(b) by 187 days.

(21) Appl. No.: 11/342,766

(22) Filed: Jan. 30, 2006

(65) Prior Publication Data

US 2007/0169173 A1 Jul. 19, 2007

(51) Int. Cl.
*H04L 9/32* (2006.01)
*G06F 15/16* (2006.01)
*H04N 7/167* (2006.01)
*H04N 7/173* (2006.01)

(52) U.S. Cl. .................. 726/2; 726/3; 726/4; 726/9; 380/200; 380/212; 713/193; 725/2; 725/100; 725/110; 725/139; 725/151

(58) Field of Classification Search .......... 726/2–4, 726/9; 380/200, 212; 713/193; 725/2, 100, 725/110, 139, 151
See application file for complete search history.

(56) References Cited

U.S. PATENT DOCUMENTS

| | | | |
|---|---|---|---|
| 4,823,386 A | 4/1989 | Dumbauld et al. | |
| 5,812,928 A | 9/1998 | Watson, Jr. et al. | |
| 5,862,219 A | 1/1999 | Glaab | |
| 6,157,719 A * | 12/2000 | Wasilewski et al. | 380/210 |
| 6,449,720 B1 | 9/2002 | Sprague et al. | |
| 6,460,086 B1 * | 10/2002 | Swaminathan et al. | 709/236 |
| 6,697,489 B1 * | 2/2004 | Candelore | 380/200 |
| 6,745,245 B1 * | 6/2004 | Carpenter | 709/229 |
| 6,757,909 B1 | 6/2004 | Maruo et al. | |
| 6,785,716 B1 * | 8/2004 | Nobakht | 709/219 |
| 2001/0054112 A1 * | 12/2001 | Nobakht et al. | 709/245 |

(Continued)

OTHER PUBLICATIONS

"DirectTV's Secret War on Hackers," Posted by michael on Thu Jan. 25, 2001 10:04 AM from the not-as-think-as-you-dumb-we-were dept. Retrieved from <http://slashdot.org/articles/01/01/25/1343218.shtml> on Dec. 17, 2007. (29 pages).

(Continued)

*Primary Examiner*—Ayaz R Sheikh
*Assistant Examiner*—Trang Doan
(74) *Attorney, Agent, or Firm*—Thelen LLP

(57) ABSTRACT

A system and method are provided for decrypting a selected program. The system and method can receive at least one authorization message and at least one control message associated with a selected program. The system and method stores the at least one authorization message. The system and method transmits a first control signal if the at least one control message specifies a type of program that can be decrypted given the at least one authorization message and transmits a second control signal if the at least one control message specifies a type of program that can not be decrypted by the decryption device given the at least one authorization message.

16 Claims, 4 Drawing Sheets

U.S. PATENT DOCUMENTS

| | | | |
|---|---|---|---|
| 2002/0076050 A1* | 6/2002 | Chen et al. | 380/231 |
| 2002/0146125 A1* | 10/2002 | Eskicioglu et al. | 380/255 |
| 2002/0157002 A1* | 10/2002 | Messerges et al. | 713/155 |
| 2003/0196113 A1 | 10/2003 | Brown et al. | |
| 2003/0206554 A1* | 11/2003 | Dillon | 370/432 |
| 2004/0015958 A1 | 1/2004 | Veil et al. | |
| 2004/0086127 A1* | 5/2004 | Candelore | 380/281 |

OTHER PUBLICATIONS

EBU Project Group B/CA. "Functional Model of a Conditional Access System," EBU Technical Review, Winter 1995, p. 64-77, European Broadcasting Union, Geneva, Switzerland. Retrieved from <http://www.ebu.ch/en/technical/trev/trev_266-ca.pdf> on Dec. 17, 2007.

"OpenCable Set-top Terminal Core Functional Requirements for Bi-Directional Cable," Interim Specification, pp. i-vi and 1-44, Cable Television Laboratories, Inc., May 15, 2001.

* cited by examiner

SYSTEM AND METHOD FOR PROVIDING A SECURE ENVIRONMENT FOR PERFORMING CONDITIONAL ACCESS FUNCTIONS FOR A SET TOP BOX

FIELD OF THE INVENTION

The present invention relates to cryptographic systems. In particular, the present invention relates to a secure decryption of information transmitted to a set top box to provide conditional access to transmitted signals.

BACKGROUND OF INVENTION

Cable and satellite television service providers utilize conditional access systems to broadcast encrypted information, representing programs, to authorized customers. Cable and satellite television service providers use a conditional access transmission system to encrypt signals so that access to the content of the signals is prevented except through a specified mechanism. Generally, cable and satellite television service providers supply set top boxes which can decrypt the signals transmitted by the cable and satellite television service providers. Each set top box can be configured to decrypt information from the cable and satellite television service providers on a per-service or per-event basis.

Many cable and satellite television service providers use the MPEG-2 encoding standard for transmission of encoded programs. MPEG-2 specifies a syntax for encoding video and audio information. It also specifies a transport stream format which allows multiple programs to be multiplexed into a single bit stream. The cable and satellite television service providers break down programs into elementary streams, for example video and audio, which are then encoded into packetized elementary streams (hereinafter "PES") consisting of variable-length packets containing coded video and audio information. PES packets are then encapsulated in 188-byte transport packets for multiplexing and transmission. MPEG-2 specifies two stream formats for transmitting content: program stream and transport stream. Transport stream is used in broadcast environments.

An MPEG-2 transport stream consists of a stream of transport packets, each of which contains a packet identifier in the header. Packets sharing the same program identifier (hereinafter "PID") are considered as belonging to the same stream. In this way, multiple independent streams can be carried in a transport stream or transport multiplex.

A set top box, provided by a particular cable or satellite television company, is configured to decrypt some or all of the individual streams carried within the transport stream sent by the particular cable or satellite television company. The set top box can be configured to decrypt transport streams on a per-service or per-event basis. The set top box generally will not work for another cable or satellite television company. If the user of the set top box elects to change from one cable or satellite television company to a second cable or satellite television company, the second cable or satellite television company must provide another set top box for the user.

SUMMARY OF THE INVENTION

An object of the present invention is to provide a system and method for the reception, decryption and decoding of information from more than one provider. In a particular embodiment, the present invention provides for the installation of a conditional access applet associated with a service provider which generates control words that allow a set top box to decrypt a selected channel.

In accordance with a first exemplary embodiment of the system of the present invention, there is provided a secure processing system for use in a set top box for decrypting a selected channel from a first service provider. The secure processing system includes a first system input for receiving at least one authorization message, a second system input for receiving at least one control message associated with a selected program, and a system output for providing a system output signal. The secure processing system also includes a data storage device and a central processing unit. The data storage device is configured to store information conveyed by the at least one authorization message. The central processing unit is configured to receive the at least one control message from the second system input, receive the at least one authorization message from the first system input and store the at least one authorization message in the data storage device. In addition, the central processing unit also executes a first conditional access applet which is configured to cause the system output to transmit a first control signal if the at least one control message specifies a type of program that can be decrypted given the at least one authorization message. The central processing unit will also cause the system output to transmit a second control signal if the at least one control message specifies a type of program that can not be decrypted by the decryption device given the at least one authorization message.

Another aspect of the invention includes a third system input for receiving a service provider identifier. Yet another aspect of the invention includes the central processing unit discontinuing execution of the first conditional access applet and beginning execution of the second conditional access applet if the service provider identifier received by the third system input is associated with a second conditional access applet.

A further aspect of the invention includes the second conditional access applet being configured to cause the system output to transmit a third control signal if the at least one control message specifies a type of program that can be decrypted by the decryption device given the at least one authorization message, and to cause the system output to transmit a fourth control signal if the at least one control message specifies a type of program that can not be decrypted by the decryption device given the at least one authorization message.

In accordance with a second exemplary embodiment of the method of the present invention, there is provided a method for decrypting a selected channel from a first service provider. The method for decrypting a selected program includes receiving at least one authorization message, receiving at least one control message associated with a selected program, and storing the at least one authorization message. An aspect of the invention includes transmitting a first control signal if the at least one control message specifies a type of program that can be decrypted given the at least one authorization message. Another aspect of the invention includes transmitting a second control signal if the at least one control message specifies a type of program that can not be decrypted by the decryption device given the at least one authorization message.

BRIEF DESCRIPTION OF THE DRAWINGS

Further objects, features, and advantages of the invention will become apparent from the following detailed description taken in conjunction with the accompanying figures showing illustrative embodiments of the invention, in which.

Figure 1:
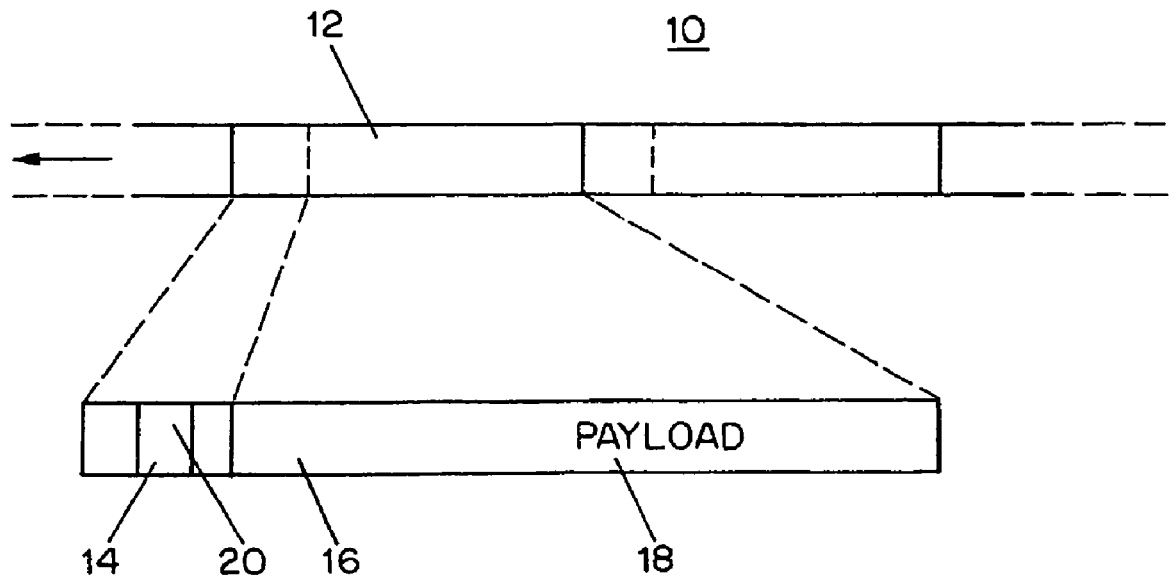
FIG. 1 is a timing diagram illustrating the prior art MPEG-2 transport stream format.

Throughout the figures, unless otherwise stated, the same reference numerals and characters are used to denote like features, elements, components, or portions of the illustrated embodiments. Moreover, while the subject invention will now be described in detail with reference to the figures, and in connection with the illustrative embodiments, changes and modifications can be made to the described embodiments without departing from the true scope and spirit of the subject invention as defined by the appended claims.

DETAILED DESCRIPTION OF THE INVENTION

U.S. patent application Ser. No. 09/313,295, filed Mar. 17, 1999, to Steven J. Sprague and Gregory J. Kazmierczak entitled "Public Cryptographic Control Unit and System Therefor" (hereinafter "Sprague et al."), the entire specification of which is herein incorporated by reference, describes a cryptographic control unit in which small software applications (hereinafter "applets") can be swapped in and/or out of the cryptographic control unit.

U.S. patent application Ser. No. 09/855,898, filed May 15, 2001, to Leonard S. Veil and Erica E. Tups entitled "Method and System for Conditional Installation and Execution of Services in a Secure Computing Environment" (hereinafter "Veil et al."), the entire specification of which is herein incorporated by reference, describes a cryptographic control unit in which applets can be swapped in and/or out of the cryptographic control unit.

FIG. 1 illustrates the prior art MPEG-2 transport stream format 10 that is used to broadcast transport streams from a cable or satellite company to a set top box. The MPEG-2 transport stream format 10 is compliant with the ISO/IEC 13838-1 specification. An MPEG-2 transport packet 12 is 188 bytes in length and includes a transport header 14, an optional adaptation field 16, and a payload 18. The transport header 14 further includes a program identifier (hereinafter "PID") 20, which is 13 bits in length. A group of MPEG-2 transport packets 12 with the same PID combine to make a packet stream, a group of related packet streams combine to make a program, and a group of programs combine to form one or more transport stream. A "program" in MPEG-2 terminology is a collection of packet streams 12 having related PIDs. An example of an MPEG-2 program may be the Home Box Office Channel or the Public Broadcasting System Channel. The PID 20 allows a system to identify the component packet streams of the individual programs.

MPEG-2 provides a general syntax for standard and private messages. A standard table, called the program association table (hereinafter "PAT"), is carried on PID 0. The PAT serves as a directory to the streams in the transport multiplex. The PAT includes many entries. Each entry in the PAT correlates a program number with the PID of a program map table (hereinafter "PMT"). The PMT lists individual PIDs associated with the particular program. A PID listed in the PMT of an access-controlled program is the PID of the ECMs associated with the selected program. The other PIDs located in the PMT indicate the PIDs of the data streams that constitute a program, for example video, audio, and the like.

Two types of messages are used in controlling access to the programs: control messages and access messages. In a preferred embodiment, the control messages are entitlement control messages (hereinafter "ECMs") and the access messages are entitlement management messages (hereinafter "EMMs"). ECMs are used to specify the access requirement associated with programs. They also typically contain the parameters needed for deriving decrypting keys or control words. ECMs are associated with individual programs. ECMs are transported "in-band" alongside the video and audio streams of a program.

EMMs are used to convey authorization to the subscribers. They are unicast addressed to each set top box, typically over an out-of-band (hereinafter "OOB") channel that the set top box is always monitoring, regardless of the channel the subscriber is watching. EMMs are associated with individual set top boxes.

Figure 2:
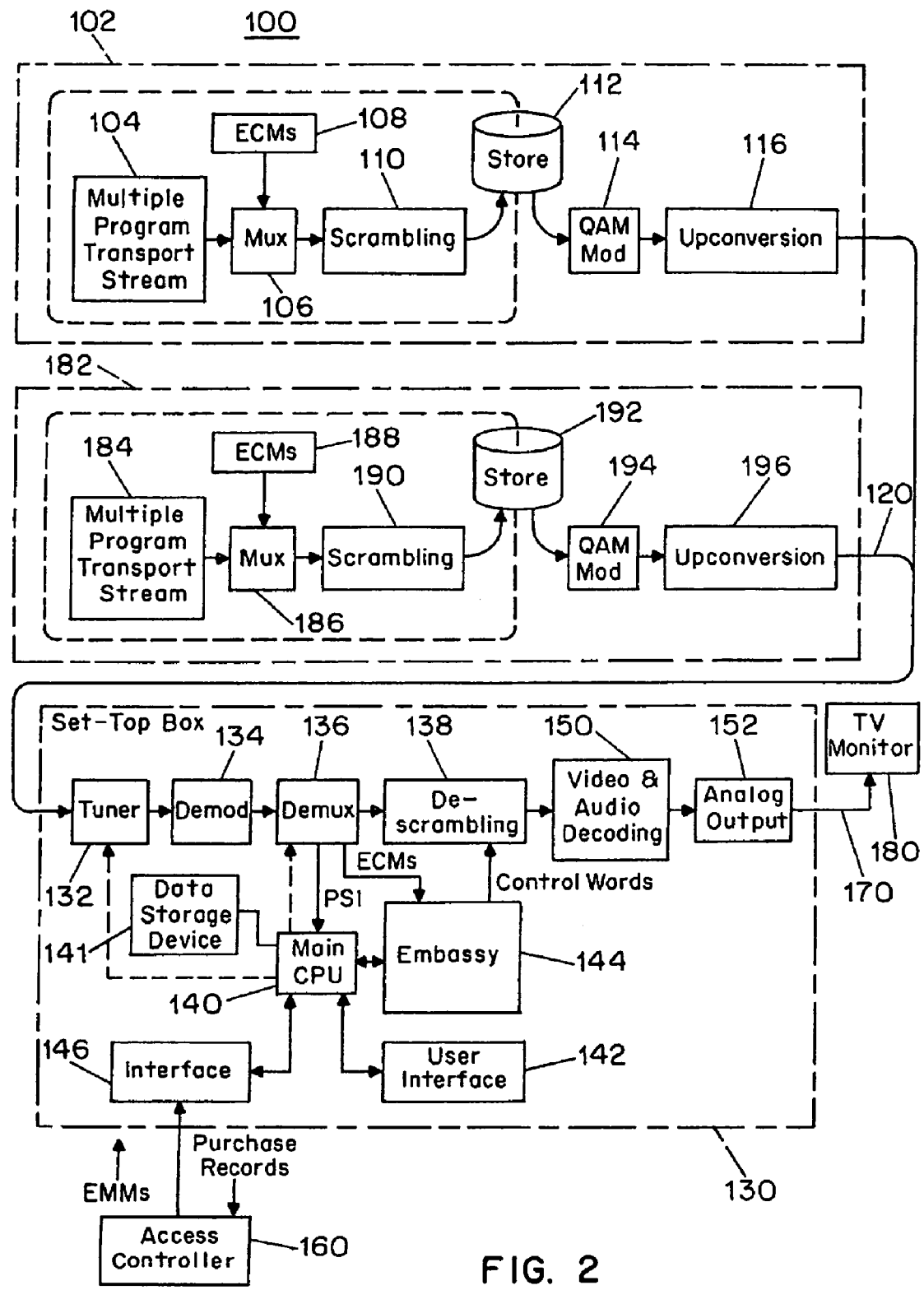
FIG. 2 is a functional block diagram illustrating a system for receiving, decrypting and decoding data from at least one service provider, according to the present invention.

FIG. 2 is a block diagram which illustrates a conditional access system 100 for broadcasting programs from a cable or satellite television provider to a set top box. The conditional access system 100 includes a television broadcasting equipment set-up 102, a television broadcasting equipment set-up 182, and one or more set top box 130. Each of the television broadcasting equipment set-up 102 and the television broadcasting equipment set-up 182 can provide one or more transport stream, representing multiple programs, over a data line 120 to the one or more set top box 130. It will be appreciated that in an ordinary system there will be thousands of set top boxes 130 and that only a single set top box is shown for purposes of explaining the present invention.

In an alternate embodiment, the television broadcasting equipment set-ups 102, 182 can be television broadcasting satellite uplinks.

The television broadcasting equipment set-up 102 includes a multiple program transport stream generator 104, an ECM generator 108, a multiplexer 106, a encryption device 110, a data storage device 112, a quadrature amplitude modulator 114, and an upconversion unit 116. The television broadcasting equipment set-up 102 broadcasts multiple programs to many set top boxes 130 using the MPEG-2 standard.

The multiple program transport stream generator 104 creates and transmits data streams to the multiplexer 106 and the ECM generator 108 creates and transmits ECMs to the multiplexer 106. The multiplexer 106 combines the data streams generated by the multiple program transport stream generator 104 and the ECMs generated by the ECM generator 108 into one or more transport stream. Preferably, the data format of the one or more transport stream comports with the MPEG-2 specification. The multiplexer 106 transmits the one or more transport stream to the optional data storage device 110.

The optional data storage device 110 acts as a buffer. The optional data storage device 110 receives and stores the one or more transport stream from the multiplexer 106 for a predetermined period of time, and then transmits the one or more transport stream to the quadrature amplitude modulator (hereinafter "QAM") 114. The QAM 114 processes the one or more transport stream and transmits a QAM carrier representing the one or more transport stream to the upconverter 116. The upconverter 116 couples the QAM carrier to a carrier wave and broadcasts the coupled data signal to the set top boxes 130 that are connected to the television broadcasting equipment set-up 102 by the data line 120.

The television broadcasting equipment set-up 182 is substantially similar to the television broadcasting equipment set-up 102. A multiple program transport stream generator 184 of the television broadcasting equipment set-up 182 is substantially similar to the multiple program transport stream generator 104, an ECM generator 188 of the television broadcasting equipment set-up 182 is substantially similar to the ECM generator 108, a multiplexer 186 of the television broadcasting equipment set-up 182 is substantially similar to the multiplexer 106, a encryption device 190 of the television broadcasting equipment set-up 182 is substantially similar to the encryption device 110, a data storage device 192 of the television broadcasting equipment set-up 182 is substantially similar to the data storage device 112, a QAM 194 of the television broadcasting equipment set-up 182 is substantially similar to the QAM 114, and an upconversion unit 196 of the television broadcasting equipment set-up 182 is substantially similar to the upconversion unit 116. The multiple program transport stream generator 184 differs from the multiple program transport stream generator 104 in that the one or more transport stream generated by the multiple program transport stream generators 184, 104 are different. The ECM generator 188 differs from the ECM generator 108 in that the ECMs generated by the ECM generators 108, 188 are different. And the upconversion unit 196 differs from the upconversion unit 116 in that the carrier frequency the upconversion unit 196 uses to couple the QAM carrier to is generally different than the carrier frequency the upconversion unit 116 uses.

The one or more set top box 130 includes a tuner 132, a demodulator 134, a demultiplexer 136, a decryption device 138, a main central processing unit (hereinafter "main CPU") 140, a data storage device 141, a user interface 142, a secure processing system 144, for example, as disclosed as the public cryptographic control unit in Sprague et al., an out-of-band interface 146, a decoder 150, and an analog output 152. The coupled data signal, received by the one or more set top box 130, is conveyed to the tuner 132. The tuner 132 is tuned to a particular carrier signal frequency by the main CPU 140 and decouples the carrier signal from the QAM carrier, thereby recovering an intermediate frequency (IF) signal. Once the IF signal is recovered, the IF signal is transmitted to the demodulator 134. The demodulator 134 demodulates the QAM carrier received by the demodulator 134 and transmits the one or more transport stream to the demultiplexer 136.

In a certain embodiment, the out-of-band interface 146 is an Ethernet interface.

The demultiplexer 136 receives the one or more transport stream from the demodulator 134, and based on control signals from the main CPU 140, conveys the appropriate data streams to the decryption device 138, the secure processing system 144, and the main CPU 140. The CPU 140 provides control signals to the demultiplexer 136 such that the demultiplexer 136 transmits two data streams of the one or more transport stream associated with a selected program to the decryption device 138, transmits one data stream of the one or more transport stream associated with the PMT of the selected program, which is program specific information (PSI), to the main CPU 140, and transmits the data streams containing the ECMs associated with the selected program to the secure processing system 144.

In an alternate embodiment, more than two data streams can be associated with the selected program, and the demultiplexer 136 can transmit the data streams associated with the selected program to the decryption device 138.

The decryption device 138 receives the two data streams transmitted by the demultiplexer 136 and decrypts the data streams depending on the control words transmitted by the secure processing system 144. If one of the EMMs stored in the secure processing system 144 gives the one or more set top box 130 the privilege to decrypt a program associated with the ECM received by the secure processing system 144 from the demultiplexer 136, the secure processing system 144 provides the control words necessary to decrypt the two transport streams. The decrypted data streams are then transmitted to the video and audio decoding unit 150. If the EMMs stored in the secure processing system 144 do not give the one or more set top box 130 the privilege to decrypt a program associated with the ECM received by the secure processing system 144 from the demultiplexer 136, the secure processing system 144 does not provide the control words necessary to decrypt the two transport streams, and encrypted data streams are transmitted to the video and audio decoding unit 150.

The video and audio decoding unit 150 receives the decrypted transport streams from the decryption device 138 and decodes the digital signals. The video and audio decoding unit 150 processes the decrypted data streams and produces an analog signal. The analog signal is transmitted to the analog output 152, which transmits the analog signal to a monitor 180 which displays the analog signal.

The out-of-band interface 146 receives EMMs, a virtual channel table and encrypted conditional access applets from an access controller 160. The EMMs convey authorization to decrypt particular types of transport streams. The virtual channel table associates a selected channel with a program number, a service provider identifier, and a particular tuner setting. The encrypted conditional access applets are service provider specific applets that are used by the secure processing system 144 to generate control words. Each of the encrypted conditional access applets is associated with a particular service provider identifier. The out-of-band interface 146 transmits the EMMs, the virtual channel table and the encrypted control word applets, received from an access controller 160, to the main CPU 140.

The main CPU 140 receives the EMMs, the virtual channel table and the encrypted conditional access applets from the out-of-band interface 146. The main CPU 140 transmits the EMMs to the secure processing system 144. The main CPU 140 stores the cable association table in the data storage device 141, and upon receipt of a selected channel, transmits the service provider identifier associated with the selected channel to the secure processing system 144. The main CPU 140 transmits the encrypted conditional access applets to the secure processing system 144 for storage therein.

The secure processing system 144 decrypts the EMMs using public-key or private-key cryptographic techniques, or both. The secure processing system 144 is described in more detail in relation with FIG. 3. The secure processing system 144 uses the decrypted conditional access applet associated with the service provider identifier of the selected channel, which is decrypted within the secure processing system 144, to compare the ECMs for the selected channel with the EMMs stored within the secure processing system 144. If the EMMs grant the one or more set top box 130 the privilege to decrypt the selected channel, the secure processing system 144 transmits control words, derived from the ECMs and the conditional access applet provided by the service provider associated with the service provider identifier, to the decrypting device 138 which cause the decrypting device 138 to decrypt the data streams received from the demultiplexer 136. For example, if one of the selected program is the Home Box Office Channel, and the ECM for the Home Box Office Channel was PREMIUM, the secure processing system 144 should have received an EMM that allows the one or more set top box 130 to decrypt PREMIUM programs in order to provide control words to the decryption device 138 which will decrypt the data streams that correspond to the Home Box Office channel. Otherwise, the secure processing system 144 does not transmit any control words to the decryption device 138, and the decryption device 138 transmits encrypted content to the decoding unit 150.

The user interface 142 receives input from a user and conveys that information to the main CPU 140. A user can command the one or more set top box 130 to turn on, turn off, select a particular channel, or purchase a pay per view event through the user interface 142. The user interface 142 transmits these commands to the main CPU 140 which carries out the particular command issued by the user. If the main CPU 140 receives a command to purchase a pay per view event, the main CPU 140 transmits a purchase record to the out-of-band interface 146. The out-of-band interface 146 receives the purchase record and transmits the purchase record to the access controller 160. In response to the purchase record, the access controller 160 transmits an appropriate EMM to the one or more set top box 130.

In an alternate embodiment, the access controller 160 may transmit EMMs to the one or more set top box 130 as out-of-band signals over the data line 120. In another alternate embodiment, the one or more set top box 130 can transmit purchase records to the television broadcasting equipment set-up 102 as out-of-band signals over the data line 120. In yet another alternate embodiment, the access controller 160 may transmit the virtual channel table to the one or more set top box 130 as an out band signal over the data line 120.

Figure 3:
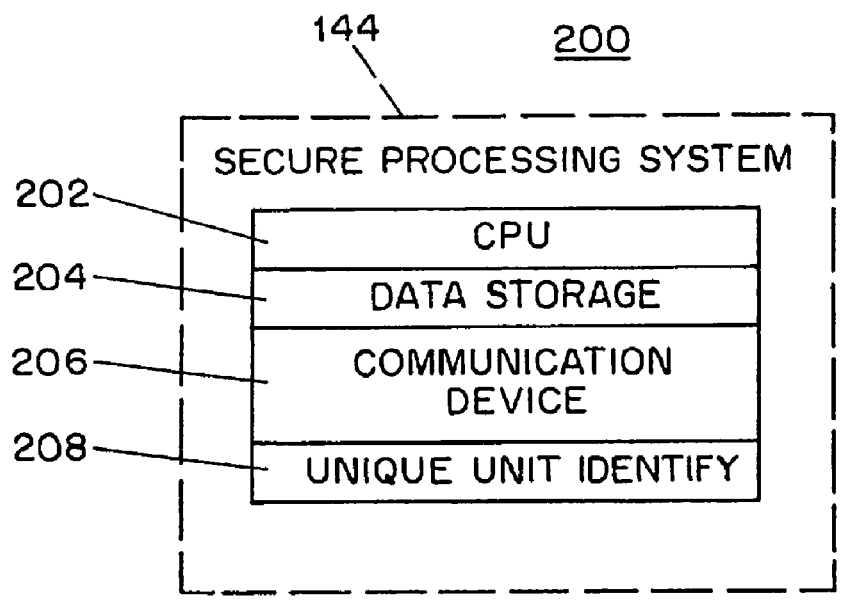
FIG. 3 is a block diagram illustrating a secure processing system according to the present invention.

FIG. 3 is a block diagram illustrating the secure processing system 144. The secure processing system 144, for example as disclosed as the public cryptographic control unit in Sprague et al., includes a central processing unit 202, a data storage device 204, a communication device 206, and a unique unit identity 208. The data storage device 204 includes memory for storing the EMMs received by the one or more set top box 130 and the conditional access applets received by the one or more set top box 130. The communication device 206 sends and receives data to and from the main CPU 140 and the demultiplexer 136, and transmits control words to the decryption device 138. The central processing unit 202 executes the conditional access applet associated with the service provider identifier received from the main CPU 140. One conditional access applet should be running at any one time.

In an alternate embodiment the data storage device 204 contains the conditional access applets in addition to the EMMs.

Figure 4:
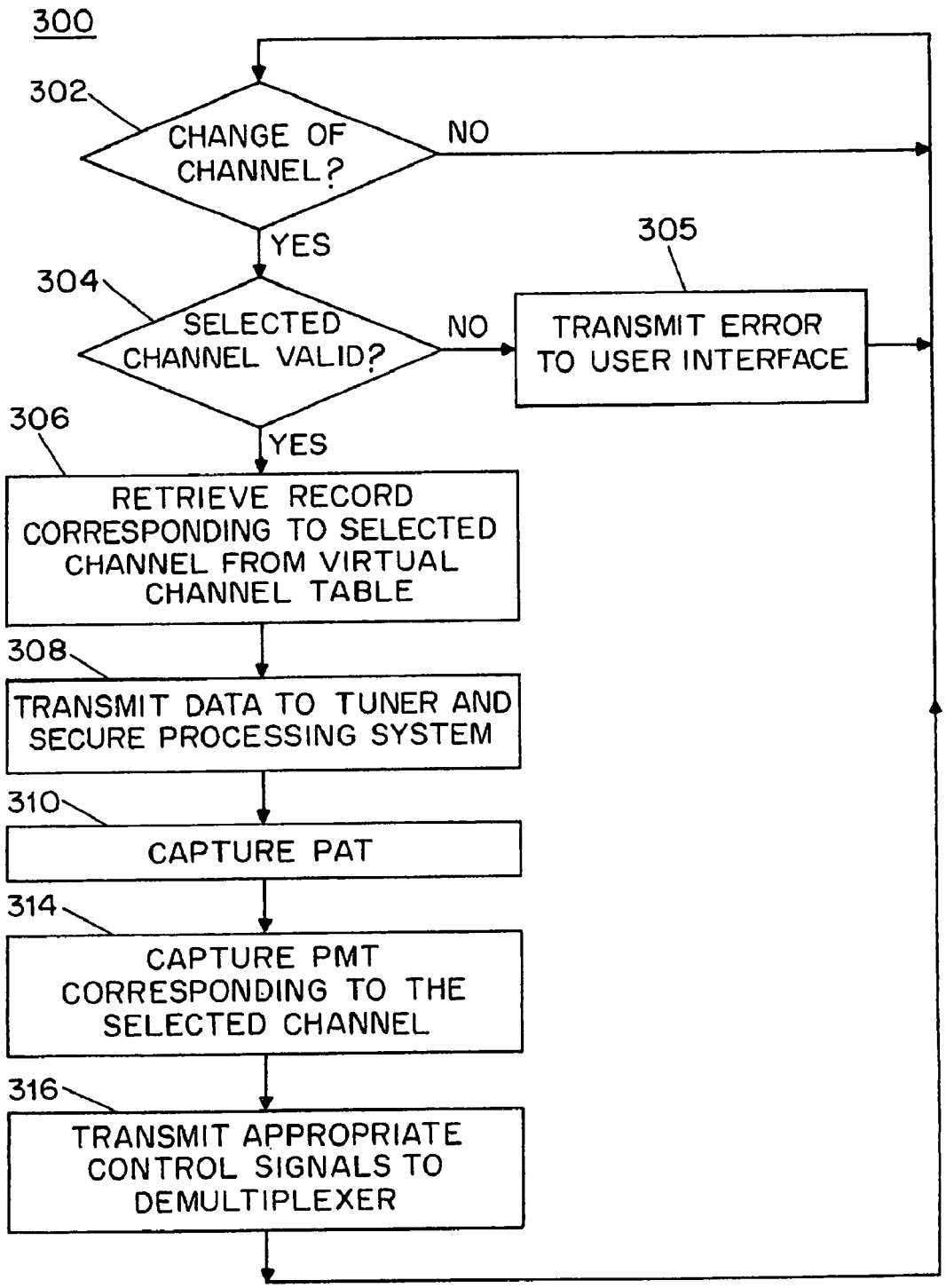
FIG. 4 is a flow chart illustrating a process for service acquisition according to the present invention.

FIG. 4 illustrates a process 300 for granting conditional access to a selected program. The process 300 begins at step 302. If the main CPU 140 receives an indication from the user interface 142 that the user has selected a new channel, the process 300 advances to step 304. Otherwise, the process 300 remains at step 302.

At step 304, the main CPU 140 determines whether the new channel is a valid channel. The main CPU 140 has the virtual channel table stored in memory. The virtual channel table associates a selected channel with a program number, a service provider identifier, and a particular tuner setting. The main CPU 140 searches the virtual channel table for a data record corresponding to the new channel. If the main CPU 140 locates a data record corresponding to the new channel, the main CPU 140 informs the secure processing system 144 that a new channel has been selected, and the process 300 advances to step 306. If the main CPU 140 does not locate a data record corresponding to the new channel, the new channel is not a valid channel and the process 300 advances to step 305.

At step 305, the main CPU 140 transmits an error indicator to the user interface 142. The user interface 142 may output an error indication to the user. Once the error indicator is transmitted to the user interface 142, the process 300 advances to step 302.

At step 306, the process 300 reads and stores the information contained within the data record of the virtual channel table corresponding to the new channel. The main CPU 140 reads the program number, the service provider identifier, and the particular tuner setting from the data record for the new channel. The main CPU 140 stores these values in the data storage device 141, and the process 300 advances to step 308.

At step 308, the main CPU 140 transmits the particular tuner setting to the tuner 132 and transmits the particular service provider identifier to the secure processing system 144. The particular tuner setting will cause the tuner 132 to recover the one or more transport stream carried on the radio frequency carrier associated with the new channel. If the particular service provider identifier for the new channel is different than the particular service provider identifier for the old channel, the secure processing system 144 will discontinue using the conditional access applet of the particular service provider identifier associated with the old channel, and begin using the conditional access applet of the particular service provider identifier associated with the new channel. This process is further disclosed as the software applet installation and execution process in Veil et al. Once the particular tuner setting and the particular service provider identifier is transmitted to the tuner 132, the process 300 advances to step 310.

At step 310, the main CPU 140 captures the PAT from the one or more transport stream received by the demultiplexer 136. The main CPU 140 does this by transmitting control signals to the demultiplexer 136 which cause the demultiplexer 136 to transmit the MPEG-2 data packets with PIDs of zero to the main CPU 140. The PAT is a table which associates each of a group of program numbers with a particular PMT PID. Each program number is associated with a single PMT PID. After the main CPU 140 captures the PAT, the main CPU 140 reads the data record corresponding to the program number associated with the new channel. The main CPU 140 stores the PMT PID associated with the new channel in memory. Once the PMT PID is stored in memory, the process 300 advances to step 314.

At step 314, the main CPU 140 captures the PMT from the one or more transport stream received by the demultiplexer 136. The main CPU 140 does this by transmitting control signals to the demultiplexer 136 which cause the demultiplexer 136 to transmit the MPEG-2 data packets with PIDs equal to the PMT PID stored in the memory of the main CPU 140 to the main CPU 140. The PMT is a table which lists a group of PIDs. The PMT lists the ECM PID, and the PIDs of the data streams of packets which combine to form the program for the new channel. The main CPU 140 reads the contents of the PMT and stores it in memory. Once the contents of the PMT are captured, the process 300 advances to step 316.

At step 316, the main CPU 140 transmits control signals to the demultiplexer 136 which cause the demultiplexer 136 to transmit the packets with the PIDs listed in the PMT associated with the new channel to the decryption device 138 and the secure processing system 144. The demultiplexer 136 transmits the MPEG-2 data packets with PIDs equal to the ECM PID to the secure processing system 144, and the MPEG-2 data packets with PIDs equal to the data stream PIDs associated with the new channel to the decryption device 138. Once the main CPU 140 transmits the control signals to the demultiplexer 136, the process 300 advances to step 302.

Figure 5:
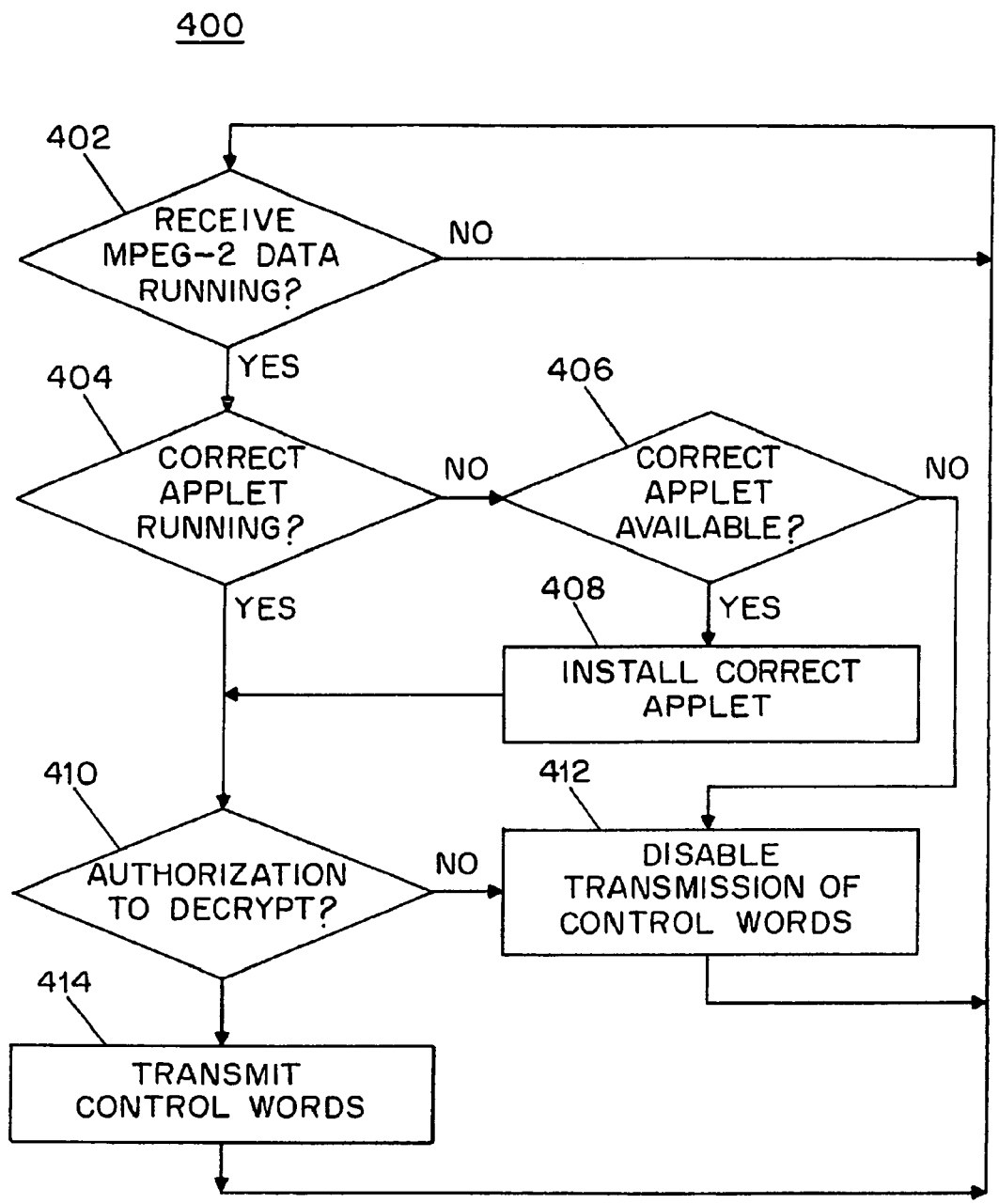
FIG. 5 is a flow chart illustrating a process for determining whether a set top box has authorization to decrypt a selected program according to the present invention.

FIG. 5 is a flow chart illustrating a process 400 for determining whether a set top box has authorization to decrypt a selected program. The process 400 begins at step 402. At step 402, if the secure processing system 144 receives an MPEG-2 data packet from the demultiplexer 136, the MPEG-2 data packet contains an ECM for the selected program and the process 400 advances to step 404. If the secure processing system 144 does not receive an MPEG-2 data packet from the demultiplexer 136, the process 400 remains at step 402.

At step 404, the secure processing system 144 determines whether the conditional access applet, currently running on the secure processing system 144, is associated with the service provider identifier received from the main CPU 140. If the conditional access applet, currently running on the secure processing system 144, is associated with the service provider identifier received from the main CPU 140, the process 400 advances to step 410. If the conditional access applet currently running on the secure processing system 144 is not associated with the service provider identifier received from the main CPU 140, the process 400 advances to step 406.

At step 406, the secure processing system 144 determines whether the conditional access applet associated with the service provider identifier is stored in the data storage device 204. The secure processing system 144 issues a request to the data storage device 204 for the control word applet associated with the service provider identifier. If the data storage device 204 has the control word applet associated with the service provider identifier, the process 400 advances to step 408. If the data storage device 204 does not have the control word applet associated with the service provider identifier, the process 400 advances to step 412.

At step 408, the secure processing system 144 begins running the control word applet associated with the service provider identifier. The secure processing system 144 reads the control word applet associated with the service provider identifier of the selected channel from the data storage device 204. The secure processing system 144 stops running the conditional access applet that was running on the secure processing system 144, encrypts the conditional access applet, and stores it within the data storage device 204. The secure processing system 144 installs and begins running the control word applet received from the data storage device 204, for example, as disclosed as the software applet installation and execution process in Veil et al. Once the control word applet associated with the service provider identifier is installed in the secure processing system 144, the process 400 advances to step 410.

At step 410, the secure processing system 144 determines whether it has authorization to decrypt the data streams associated with the new channel. The secure processing system 144 uses the conditional access applet currently running on the secure processing system 144 to compare the ECMs received from the demultiplexer 136 to the EMMs received from the main CPU 140. If the one or more set top box 130 contains EMMs granting the one or more set top box 130 permission to decrypt a channel which is associated with the ECMs received from the demultiplexer 136, the process 400 advances to step 414. Otherwise, the secure processing system 144 does not have authorization to decrypt the data streams associated with the new channel, and the process 400 advances to step 412.

At step 412, the secure processing system 144 discontinues transmitting appropriate control words to the decryption device 138. If the secure processing system 144 does not transmit appropriate control words to the decryption device 138, the decryption device 138 will not decrypt the one or more transport stream received from the demultiplexer 136. After the secure processing system 144 discontinues transmission of the appropriate control words to the decryption device 138, the process 400 advances to step 402.

At step 414, the secure processing system 144 transmits appropriate control words to the decryption device 138, such that the decryption device 138 decrypts the one or more transport stream received from the demultiplexer. The secure processing system 144 uses the control word generator for the service provider identifier associated with the new channel to generate control words for the decryption device 138. Once the control words are generated by the control word generator for the service provider identifier associated with the new channel, the control words are transmitted to the decryption device 138, and the process 400 advances to step 402. Once control words are transmitted to the decryption device 138, the secure processing system 144 continues to transmit the control words to the decryption device 138 until such time as the secure processing system 144 discontinues transmission of the control words to the decryption device 138.

The invention has been described in connection with certain preferred embodiments thereof. It will be appreciated that those skilled in the art can modify or alter such embodiments without departing from the scope and spirit of the invention which is set forth in the appended claims.

What is claimed is:

1. A secure processing system for a set top box, comprising:
    a first system input for receiving at least one authorization message;
    a second system input for receiving at least one control message associated with a selected program;
    a system output for providing a system output signal;
    a data storage device, the data storage device configured to store information associated with the at least one authorization message and configured to receive a plurality of conditional access client applets associated with a plurality of service providers, wherein a first conditional access client applet from the plurality of conditional access client applets is configured to enable access to one or more types of programs distributed from a first service provider and a second conditional access client applet from the plurality of conditional access client applets is configured to enable access to one or more types of programs distributed from a second service provider;
    a processing unit configured to receive the at least one control message from the second system input, receive the at least one authorization message from the first system input, store the information associated with the at least one authorization message in the data storage device, and execute the first conditional access client applet, the first conditional access client applet configured to cause the system output to transmit a first control signal if the at least one control message specifies a type of program that the set top box is authorized to decrypt given the information associated with the at least one authorization message, and to cause the system output to transmit a second control signal if the at least one control message specifies a type of program that can not be decrypted by the decryption device given the at least one authorization message.

2. The secure processing system of claim 1, wherein the first control signal is adapted to cause a set top box to decrypt an encrypted signal and transmit a decrypted signal representing the selected program.

3. The secure processing system of claim 1, wherein the second control signal is adapted to cause the set top box to transmit an encrypted signal representing the selected program.

4. The secure processing system of claim 1, further comprising a third system input for receiving a service provider identifier.

5. The secure processing system of claim 4, wherein if the service provider identifier received by the third system input is associated with the second conditional access client applet, the central processing unit discontinues execution of the first conditional access client applet and executes the second conditional access client applet.

6. The secure processing system of claim 5, wherein the second conditional access client applet is configured to cause the system output to transmit a third control signal if the at least one control message specifies a type of program that can be decrypted by the decryption device given the at least one authorization message, and to cause the system output to transmit a fourth control signal if the at least one control message specifies a type of program that can not be decrypted by the decryption device given the at least one authorization message.

7. The secure processing system of claim 6, wherein the third control signal is adapted to cause a set top box to decrypt an encrypted signal and transmit a decrypted signal representing the selected program.

8. The secure processing system of claim 6, wherein the fourth control signal is adapted to cause the set top box to transmit an encrypted signal representing the selected program.

9. The secure processing system of claim 1, wherein the data storage device is non-volatile random access memory.

10. A method for decrypting a selected program on a secure processing system for a set top box, the method comprising:
receiving at least one authorization message;
receiving at least one control message associated with a selected program;
storing information conveyed by the at least one authorization message;
receiving a plurality of conditional access client applets associated with a plurality of service providers, wherein a first conditional access client applet from the plurality of conditional access client applets is configured to enable access to one or more types of programs distributed from a first service provider and a second conditional access client applet from the plurality of conditional access client applets is configured to enable access to one or more types of programs distributed from a second service provider;
transmitting a first control signal if the at least one control message specifies a type of program that the set top box is authorized to decrypt given the at least one authorization message; and
transmitting a second control signal if the at least one control message specifies a type of program that can not be decrypted by the decryption device given the at least one authorization message.

11. The method of claim 10, wherein in response to the first control signal, an encrypted signal from the first service provider is decrypted and transmitted representing the selected program.

12. The method of claim 10, wherein in response to the second control signal, an encrypted signal is transmitted representing the selected program.

13. The method of claim 10, further comprising the step of receiving a service provider identifier.

14. The method of claim 13, further comprising the step of transmitting a third control signal if the at least one control message specifies a type of program that can be decrypted given the at least one authorization message, and transmitting a fourth control signal if the at least one control message specifies a type of program that can not be decrypted given the at least one authorization message.

15. The method of claim 14, wherein in response to the third control signal, an encrypted signal from the second service provider is decrypted and transmitted representing the selected program.

16. The method of claim 15, wherein in response to the fourth control signal, an encrypted signal is transmitted representing the selected program.

* * * * *